Dec. 20, 1955    E. S. RITTNER ET AL    2,727,968
ELECTRIC HYGROSCOPE
Original Filed Feb. 8, 1949

*INVENTORS*
EDMUND S. RITTNER
SAMUEL FINE
BY *Fred M. Vogel*

AGENT

United States Patent Office 2,727,968
Patented Dec. 20, 1955

2,727,968

ELECTRIC HYGROSCOPE

Edmund S. Rittner, Peekskill, and Samuel Fine, New York, N. Y., assignors, by mesne assignments, to North American Philips Company, Inc., New York, N. Y., a corporation of Delaware Original application February 8, 1949, Serial No. 75,118, now Patent No. 2,638,783, dated May 19, 1953. Divided and this application January 29, 1953, Serial No. 341,732

3 Claims. (Cl. 201—63)

This application is a divisional application of our copending application entitled "Relative Humidity Measuring Apparatus," Serial No. 75,118, filed February 8, 1949, now Patent No. 2,638,783.

Our invention relates to computing devices.

In numerous chemical and physical problems, it is often necessary to evaluate exponential functions involving temperature for example, exponential functions of the form $$y = y_0 e^{\pm \frac{A}{kT}} \quad (1)$$

wherein $y$ is the dependent variable and $T$ is the absolute temperature. The independent parameters $A$ and $y_0$ can also be temperature dependent although in most cases the temperature dependence of $y_0$ is small relative to that of the exponential term.

Exponential functions of the above type arise in such problems as the determination of the equilibrium pressure of a liquid or solid, of the partial pressure of a solvent vapor above a solution, of the equilibrium constant of a chemical reaction, of the specific reaction rate velocity of a chemical reaction, of the absolute humidity of air, and of the relative humidity of air, and in related physical or chemical problems.

It is often desired to obtain solutions of equations of the above type for a large number of assigned temperatures, in which case it is time-consuming and laborious to perform the necessary operations in the solution of the equation by conventional mathematical methods. This is especially the case when the parameter $A$ varies with temperature.

It is therefore an object of our invention to provide a simple computing device which is adapted to yield precise values of the dependent variable in the above-described equation at all assigned values of temperature.

The foregoing object is attained in accordance with the invention by means of a computing device embodying a temperature responsive element whose conductance changes in accordance with the law:

$$O = O_0 e^{-\frac{U}{kT}} \quad (2)$$

In Equation 2, $O$ signifies the conductance, $O_0$ the value of conductance which the substance would exhibit at an infinitely high temperature, $U$ the conduction activation energy of the substance, $T$ the absolute temperature at which the substance is to be maintained, and $k$ a constant which reduces the exponent to a dimensionless number.

Elements having a behavior conforming to Equation 2 may be formed of substances belonging to the general class of semi-conductors and insulators, such as, thallium sulfide, zinc oxide, titanium dioxide, cobalt oxide containing a lithium impurity, nickel oxide containing a lithium impurity, cuprous oxide, and various impurity type semi-conductors described in Belgian Patent No. 475,570. As a further feature of the invention, elements constituted by such semi-conductors and insulators are formed into networks, whereby the value of and temperature dependence of the equivalent conduction activation energy is matched to the value and temperature dependence of the parameter $A$ in Equation 1.

The invention will now be described with reference to the appended drawing wherein.

Figures 4 to 9a inclusive illustrate several elementary circuits in accordance with the invention for measuring either the conductance or resistance of elements obeying the said conductivity law.

The invention will be described with particular reference to the determination of both relative and absolute humidities of air. However, it is to be understood that the invention is applicable to other physical or chemical problems and the following description is intended to be illustrative only.

In order to measure the equilibrium pressure of water, reference is had to Clapeyron's equation which after making simplifying assumptions and integrating, can be expressed in the following form:

$$P = P_0 e^{-\frac{Q}{RT}} \quad (3)$$

$P$ being the equilibrium pressure, $P_0$ being the equivalent value of the equilibrium pressure of water at an infinitely high temperature, $Q$ the latent heat of evaporation of water, $R$ the universal gas constant having a value 1.9864 calories per mole per degree centigrade and $T$ the absolute temperature in degrees Kelvin.

Figure 1:
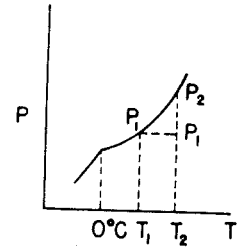
Figure 1 is a graph showing the change in the equilibrium vapor pressure of water as a function of temperature.

The absolute humidity in air is defined as the concentration or partial pressure of water-vapor actually present in the air. Referring to Fig. 1, the curve shows the equilibrium vapor pressure of ice and liquid water as a function of temperature over a range of temperatures extending from below the freezing point to approximately the boiling point of water. This curve also represents substantially the partial pressure of water vapor in air in equilibrium above ice and liquid water as a function of temperature over the same temperature range.

Let the ordinate $P_1$ represent the partial pressure of water vapor (and correspondingly the absolute humidity) in the atmosphere at temperature $T_2$. The equilibrium vapor pressure corresponding to this temperature is then given by the ordinate $P_2$. $P_1$, however, has substantially the same value as the equilibrium pressure of water-vapor at a lower temperature $T_1$, commonly referred to as the dew-point temperature. $P_1$ can be calculated by using Equation 3 as follows:

$$P_1 = P_0 e^{-\frac{Q}{RT_1}} \quad (4)$$

In accordance with the invention the equilibrium partial pressure $P_1$ at the dew-point temperature is determined by measuring the conductance of a semi-conductor having an activation energy equivalent to $Q$. Thus from Equation 1:

$$O_1 = O_0 e^{-\frac{U}{RT_1}} \quad (5)$$

when $U$ is specified in calories per mole, and hence, $P_1$ is directly proportional to $O$.

The relative humidity $H$ is defined as the ratio of the partial pressure of water in air to the saturation pressure at the same temperature:

$$H = \frac{P_1}{P_2} \quad (6)$$

From Equation 3

$$H = \frac{e^{-Q/RT_1}}{e^{-Q/RT_2}} \quad (7)$$

By measuring $P_1$ at the dew-point temperature and $P_2$ at the ambient temperature, by means of two elements constituted respectively by a semi-conductive substance or substances having appropriate values of U, the relative humidity is measured. More specifically from Equations 2, 3 and 6 we have:

$$H = \frac{e^{-\frac{U}{RT_1}}}{e^{-\frac{U}{RT_2}}} = \frac{O_1}{O_2} \quad (8)$$

The elements for measuring either absolute humidity or relative humidity of air are constituted by semi-conductive materials which have activation energies corresponding to the latent heat of evaporation of liquid water, or of ice when the equilibrium or partial pressure of water-vapor above ice is desired. Suitable elements for the purpose of the invention may be formed, for example, by semi-conductive substances and insulators as follows. An element of thallium sulfide having an activation energy between 0.41 and 0.79 electron volts is prepared as described by von Hippel, Chesley, Denmark, Ulin and Rittner in the Journal of Chemical Physics, vol. 14, page 361 (1946). An element of zinc oxide having an activation energy between 0.01 and 0.6 of electron volts is prepared as described by Mott and Guerney in "Electronic Processes in Ionic Crystals," Oxford University Press, 1940, page 165. An element of cuprous oxide is prepared with an activation energy between 0.06 and 0.6 electron volts as described in Seitz in "Modern Theory of Solids," McGraw-Hill, N. Y., 1940, page 65. An element of titanium dioxide having an activation energy between .027 and 1.65 electron volts is prepared as described by W. Meyer in "Zeitschrift fur Technische Physik," vol. 16, page 358 (1935).

Since the latent heat of evaporation of liquid water is 10,730 calories per mole (0.466 e. v.) at 0° C. and varies monotonically with temperature to 9740 calories per mole at 100° C. (0.423 e. v.) and since the latent heat of evaporation of ice is substantially 12,200 cal./mole between −80 and 0° C., elements constituted by semi-conductive substances prepared in accordance with any of the methods referred to above, as well as a great many others, are suitable for approximating the equilibrium partial pressure curve of water in air. However, in order to obtain even more accurate results, it is desirable that an element constituted by a semi-conductive substance having an activation energy which varies with temperature in close approximation to the dependence of the latent heat of evaporation of water with temperature be employed.

Figure 2:
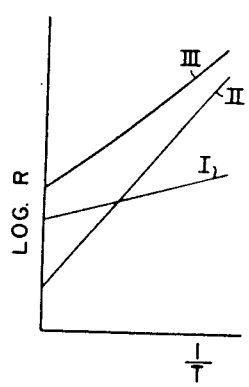
Figure 2 is a graph showing typical curves of the resistance of elements obeying the conductivity law above pointed out and of these elements connected in series combination.
Figure 3:
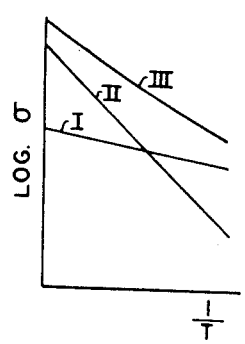
Figure 3 is a graph showing typical characteristics of elements having a conductance obeying the said conductivity law and of these elements connected in parallel combination.

For this purpose, reference is now made to Figures 2 and 3. If Equation 2 is inverted, the reciprocal of conductance is obtained as a function of an exponential equation. Since the reciprocal of conductance is resistance, we have:

$$R = R_0 e^{+\frac{U}{kT}} \quad (9)$$

In Fig. 2 the variation of the logarithm of the resistance of the material is plotted against values of the reciprocal of the absolute temperature. The slope of the curve, it will readily be seen by taking the logarithms of both sides of Equation 9 is the value of the parameter $U/k$.

Curve I shows a constant slope when values of the logarithm of R, the resistance of one element constituted by a semi-conductive substance or insulator, are plotted against the reciprocal values of temperature. Curve II shows a constant slope when values of the logarithm of R, the resistance of a second element constituted by a semi-conductive substance or insulator are plotted against reciprocal values of temperature. Curve III, however, represents the total values of the logarithm of R plotted against reciprocal values of temperature when the first and second elements are connected in series. It will now be seen that the slope of curve III changes with temperature so that the equivalent activation energy of the combination of two such elements constituted by either semiconductors or insulators when connected in series varies with temperature.

Fig. 3 shows the same effect when the elements are connected in parallel with the exception that in this case values of the logarithm of conductance O are more conveniently plotted.

For example, it is desired to obtain an element according to the invention constituted by one or more semi-conductive substances having an equivalent activation energy varying with temperature which closely approximates the variation of the latent heat of evaporation of liquid water with temperature. An element of thallium sulfide is first prepared with an activation energy of 11,730 calories per mole (0.510 e. v.). An element of titanium dioxide is likewise prepared with an activation energy of 8830 calories per mole (.394 e. v.). The titanium dioxide element and the tallium sulfide element are given resistance values whereby the ratio of the resistance of the former to the latter is 110.6. The two elements are then connected in series and the equivalent activation energy of the combination will closely approximate the change in latent heat of evaporation of water with temperature as follows:

| T., °C. | 0 | 25 | 50 | 75 | 100 |
|---|---|---|---|---|---|
| U, cal./mole | 10,730 | 10,420 | 10,146 | 9,918 | 9,734 |
| Q, cal./mole | 10,730 | 10,490 | 10,250 | 9,995 | 9,740 |

While this is a particular example of the manner in which an element according to the invention can be constructed for the purpose of closely matching the equilibrium partial pressure curve of water in air, it is to be understood that elements constituted by several semi-conductive substances or even insulators can be formed to attain an even closer approximation of the equilibrium partial pressure curve of water in air. In particular, it has been found desirable to employ a particularly useful expedient for determining the partial pressure of water above both liquid water and ice. Two separate elements having equivalent activation energies corresponding to the latent heat of evaporation of liquid water and the latent heat of sublimation of ice with means to change from one to the other at any desired temperature are employed to determine the partial pressure of water above ice, above liquid water, and even above super-cooled water.

A further, and particular example of an element according to the invention, is a substance with an activation energy having a temperature dependence closely corresponding to the temperature dependence of the latent heat of evaporation of liquid water, whereby the conductance of this element gives an almost exact indication of the partial pressure of water in air at any temperature between 0° and 100° C. In fact, when this element according to the invention is employed to measure absolute humidity, values of absolute humidity within 3% of that obtained with a conventional dew-point apparatus have been observed. Similarly, relative humidity values of only 1 to 3% from those obtained with the use of a conventional sling psychrometer have been observed.

Such an element is prepared by mixing approximately 126 grams of $NiCO_3$ and 3.34 grams of $Li_2CO_3$, grinding the mixture, heating in air to 500° C. for two hours, molding the mixture into a rod and subsequently sintering at 1200° C. for two hours. Terminals are applied to the ends of the rod by heating the ends, applying a ceramic silver paste, reheating the ends to burn off organic matter followed by careful reheating until a white silver layer results at the ends of the rod. This silver layer is tinned and a copper wire soldered thereto.

Figure 4:
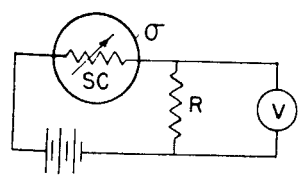

In making determinations of absolute or relative humidity of air, the partial pressure of a solvent vapor over a solution, specific reaction rate velocities and the like, the conductance or resistance of elements constituted by semi-conductive substances or insulators is determined as illustrated in Figures 4 to 9a. In Figure 4, the conductance O of the element SC which is constituted by a semi-conductive substance or an insulator is conveniently measured by measuring the potential drop with a voltmeter V across a fixed resistor R having a resistance very much smaller than the reciprocal of O.

Figure 5:
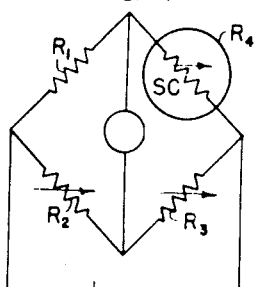

In Fig. 5, either the conductance or resistance of an element $R_4$ constituted by a semi-conductive substance or an insulator SC can be measured with a conventional bridge circuit having resistance elements $R_1$, $R_2$ and $R_3$. To measure the resistance of $R_4$, resistor $R_3$ is made variable and the bridge balanced, since $R_4$ is directly proportional to $R_3$. To measure the conductance of $R_4$, $R_2$ is made variable and the bridge balanced, since the conductance $1/R_4$ is directly proportional to $R_2$.

Figure 6:
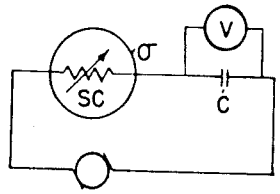

In Fig. 6, the element SC constituted by a semi-conductive substance or an insulator is connected in series with a source of A.-C. potential and a capacitor C of much lower impedance than the reciprocal of O, so that the potential measured across the capacitor is directly proportional to the conductance O of SC. This circuit is also useful for controlling auxiliary equipment since the time-constant and hence the natural damping frequency of this circuit will be governed by the value of conductance of SC.

Figure 7:
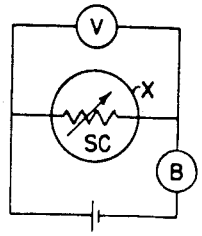

Fig. 7 shows a simple circuit for measuring the resistance X of an element SC constituted by a semi-conductive substance or an insulator by connecting it in series with a battery and an ammeter A calibrated to read in units of resistance.

Figure 8:
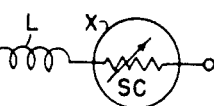

Fig. 8 shows a simple circuit for measuring the resistance X of an element SC constituted by a semi-conductive substance or an insulator by measuring the potential drop thereacross when the SC is connected in series with a constant current barretter B and a battery.

Figure 9:
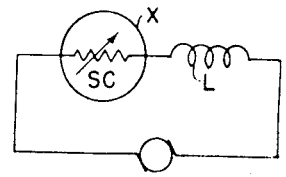

Fig. 9 shows a simple circuit for measuring the resistance of an element SC constituted by a semi-conductive substance or an insulator by means of a series inductance L of much lower impedance than the reciprocal of the conductance. In this case, the potential developed across the inductance with alternating current flowing through the series combination is directly proportional to the value of the resistance of the semi-conductor.

Figure 9A:
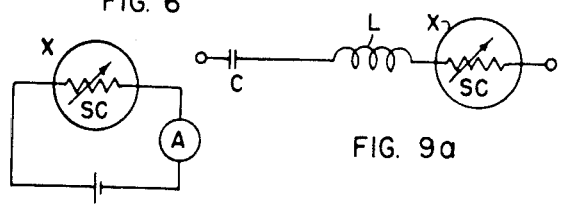

Fig. 9a shows one variant of a simple resonant circuit in which the element SC constituted by a semi-conductive substance or insulator controls the damping of the series combination of inductance L and capacitor C to thereby control auxiliary circuits.

While numerous examples of the substances employed have been given, numerous applications have been indicated, and numerous manners in and circuit arrangements have been described for applying the invention into practice, it is of course recognized that the number of modifications are legion and it would be impossible to describe all of these modifications. It is therefore our desire that the invention described herein be construed as liberally as possible in view of the prior art.

What we claim is:

1. A condition-responsive element for determining values at a given absolute temperature T of the temperature dependent variable $y$ in the equation $$y = y_0 e^{\pm \frac{A}{kT}}$$

$y_0$ and A being temperature dependent parameters and $k$ a constant having the same units of measurement as A, comprising a thermally responsive resistance element having a resistance $$R = R_0 e^{\pm \frac{U}{kT}}$$

$R_0$ being a resistance parameter and U being a parameter equal in magnitude and having substantially the same temperature dependence as A.

2. A condition-responsive element as claimed in claim 1 in which the thermally responsive resistance element comprises a plurality of series-connected thermally responsive resistors each having the characteristic $$R = R_0 e^{\pm \frac{U}{kT}}$$

the total value of U of the element being equal in magnitude to and having the same temperature dependence as A.

3. A condition-responsive element as claimed in claim 1 in which the thermally-responsive resistance element comprises a plurality of parallel-connected thermally responsive resistors each having the characteristic $$R = R_0 e^{\pm \frac{U}{kT}}$$

the total value of U of the element being equal in magnitude to and having the same temperature dependence as A.

References Cited in the file of this patent

UNITED STATES PATENTS

| | | |
|---|---|---|
| 2,638,784 | Rittner et al. | May 19, 1953 |

FOREIGN PATENTS

| | | |
|---|---|---|
| 558,299 | Great Britain | Dec. 30, 1943 |

OTHER REFERENCES

Bulletin: Keystone Carbon Company, Inc., St. Marys, Pa., entitled "Technical Information on Negative Temperature Coefficient Resistance Material," 1943 (8 pages text, 5 pages graphs).